United States Patent [19]
Yamamoto

[11] Patent Number: 5,854,421
[45] Date of Patent: Dec. 29, 1998

[54] SEMICONDUCTOR SENSORS AND METHOD FOR ADJUSTING THE OUTPUT

[75] Inventor: Masahiro Yamamoto, Tokyo, Japan

[73] Assignee: Mitsubishi Denki Kabushiki Kaisha, Tokyo, Japan

[21] Appl. No.: 729,407

[22] Filed: Oct. 11, 1996

[30] Foreign Application Priority Data

May 28, 1996 [JP] Japan .................................. 8-133761

[51] Int. Cl.$^6$ .............................. G01L 9/06; G01L 27/00; G01P 15/12; G01P 21/00
[52] U.S. Cl. ........................... 73/1.88; 73/514.33; 73/721
[58] Field of Search ............................... 73/514.33, 1.88, 73/721, 727, 777, 1.15, 1.38, 1.62, 31.06

[56] References Cited

U.S. PATENT DOCUMENTS

| | | | |
|---|---|---|---|
| 3,886,799 | 6/1975 | Billette et al. | 73/727 |
| 3,899,695 | 8/1975 | Solomon et al. | 73/727 X |
| 4,765,188 | 8/1988 | Krechmery et al. | 73/727 X |
| 4,817,022 | 3/1989 | Jornod et al. | 73/1.62 X |
| 4,990,986 | 2/1991 | Murakami | 257/149 |
| 5,023,973 | 6/1991 | Tsuchida et al. | 15/319 |
| 5,042,307 | 8/1991 | Kato | 73/727 X |
| 5,241,850 | 9/1993 | Kawate | 73/1.38 X |
| 5,396,439 | 3/1995 | Yamada | 73/514.33 X |
| 5,408,885 | 4/1995 | Araki | 73/727 X |
| 5,460,050 | 10/1995 | Miyeno | 73/721 X |
| 5,499,526 | 3/1996 | Muro | 73/514.33 |
| 5,614,673 | 3/1997 | Yamamoto | 73/514.33 |
| 5,631,602 | 5/1997 | Kearney | 73/1.88 X |

FOREIGN PATENT DOCUMENTS 59-163533  9/1984  Japan .
63-127164  5/1988  Japan .

OTHER PUBLICATIONS

*Patent Abstracts of Japan* (56–11650) Gipi PO58, vol. 5, No. 60 Abs pub date Apr. 23, 1981 "Record Player" Kimura.
*Patent Abstracts of Japan* (63–255664) Grip p. 829, vol. 13, No. 70 Abs. Pub. date Feb. 17, 1989 "Semiconductor Server Amplifving Circuit".
*Patent Abstracts of Japan* (03–108906) Grp E 1096, vol. 15, No. 304 Abs. Pub. date Aug. 5, 1991 "Amplfying Circuit" Matsubora .
*Patent Abstracts of Japan* (05–281254) Grp. P1685, vol. 18, No. 64 Abs pub date Feb. 2, 1994 "Semiconductor Acceleration Sensor" Ito.

*Primary Examiner*—Thomas P. Noland

[57] ABSTRACT

A semiconductor sensor having a semiconductor sensor chip with a diaphragm on which a bridge circuit is formed with piezoresistances has a resistor for adjusting an offset of the bridge circuit wherein an adjustment is done to equalize an output voltage of the sensor at the upper operating limit temperature to that at the lower operating limit temperature by trimming the resistor.

4 Claims, 2 Drawing Sheets

SEMICONDUCTOR SENSORS AND METHOD FOR ADJUSTING THE OUTPUT

BACKGROUND OF THE INVENTION

1. Field of the Invention

The present invention relates to a semiconductor pressure sensor which comprises a strain detecting element formed on or in a semiconductor substrate and which produces electrical output signals generated by change in the resistance of the strain detecting element when it is elastically deformed, more particularly, a semiconductor acceleration sensor used for the ABS or SRS of an automobile and a semiconductor pressure sensor used for the fuel injection control of an automobile.

2. Description of the Prior Art

Vibration or acceleration is generally measured by means of a semiconductor acceleration sensor which has a cantilever structure of a semiconductor sensor chip, which comprises a thin diaphragm of a piezoresistance device utilizing the piezoresistance effect of the semiconductor and has thick portions formed on both sides of the diaphragm, one of the thick portions being fixed onto a pedestal on a base and the other thick portion being left free. Force exerted on the acceleration sensor is determined by the change in the resistance of the piezoresistance device.

One end of the sensor chip of the semiconductor acceleration sensor is fixed onto a pedestal formed on a ceramic substrate so that it forms a cantilever structure. The diaphragm is formed by etching the back surface of the sensor chip. Four resistors (referred to as the piezoresistors) are formed on the front surface of the diaphragm so that strain is concentrated on the piezoresistors. The four piezoresistors are connected with aluminum wiring to form a bridge circuit and these act as an acceleration detecting element.

When the acceleration sensor is accelerated, the sensor chip bends at the diaphragm and a strain occurs at the diaphragm, which causes a change in the resistances of the piezoresistors depending on the magnitude of the strain (or the acceleration). The change in the resistances causes the bridge circuit to produce an unbalanced voltage output (referred to as the acceleration signal) which is a measure of the acceleration. Since a typical acceleration signal is small, a signal processing circuit, including a signal amplifier, a diagnostic circuit, and an abnormality detection circuit, is also formed on the sensor chip.

The above signal processing circuit is connected to a hybrid integrated circuit (hybrid IC) formed on the aforementioned ceramic substrate by gold or aluminum bonding wiring, the hybrid IC comprising a thick-film resistor substrate including a high-pass filter capacitor, a sensitivity adjusting resistor, and an offset adjusting resistor. Thus, an acceleration signal is amplified by the signal processing circuit, modified by the hybrid IC, and then transferred to an external device such as a microcomputer via lead terminals mounted on the ceramic substrate.

In the above configuration, the acceleration signal is differentially amplified with a differential amplifier of the signal processing circuit, passes through the high-pass filter formed with resistors and capacitors on the ceramic substrate, is transferred back to the signal processing circuit, where the signal is amplified again, and is output through the lead terminals. The high-pass filter and the amplifier of the signal processing circuit use a constant voltage VA as a reference voltage. In order to reduce the rise time of the semiconductor acceleration sensor when the power is switched on, the output voltage VB of the aforementioned differential amplifier is adjusted by trimming the offset adjusting resistor so that the VB is equal to the VA.

The silicon material of the sensor chip and the passivation layer (or the silicon dioxide) have different thermal expansion coefficients, which causes the sensor chip to bend due to the bimetal effect. Since the bimetal effect is temperature dependent, the output of the bridge circuit is also temperature dependent. Therefore, although VB is adjusted to be equal to VA by trimming the resistor at a room temperature, the VB would significantly differ from the VA at a higher or lower temperature. For example, assume that a semiconductor acceleration sensor has undergone the trimming adjustment at a room temperature, that the rise times at the upper limit and lower limit operating temperatures of the semiconductor acceleration sensor are Ta and Tb, respectively, and that Ta is greater than Tb. (The rise time is defined as the time it takes the semiconductor acceleration sensor to produce stable output signals after the power is turned on.) Then the claimed rise time for the semiconductor acceleration sensor should be Ta.

Therefore, the design using this semiconductor acceleration sensor must use the rise time of Ta for all operating temperatures. This illustrates that the rise time after the power is turned on is not sufficiently reduced over the entire operating temperature range guaranteed for the semiconductor acceleration sensor.

SUMMARY OF THE INVENTION

An object of the present invention is to solve this problem, to provide a semiconductor sensor which has a short rise time guaranteed over the entire operating temperature range, and to demonstrate a method for adjusting its output.

The present invention relates to a semiconductor sensor employing a semiconductor device as a sensor element. The present invention provides a semiconductor sensor comprising (a) a sensor means including a bridge circuit formed with pioezoresistors exhibiting the piezoresistance effect of semiconductor; (b) a high-pass filter comprising a capacitor and a resistor; (c) a prestage amplifier which is placed before the high-pass filter and differentially amplifies an unbalanced voltage produced at the sensor portion; (d) a poststage amplifier which is placed after the high-pass filter and amplifies the output voltage that passed through said high-pass filter after having been amplified by said prestage amplifier; (e) a reference voltage supply providing a reference voltage to the high-pass filter and the poststage amplifier; and (f) an offset adjusting means with which the offset of the sensor portion is adjusted. The offset adjusting portion adjusts the output voltage Vm of the prestage amplifier by adjusting the offset of the sensor portion in order to reduce the maximum rise time of the output of the poststage amplifier after the power supply is switched on.

More specifically, the output voltage Vm of the prestage amplifier is adjusted using the offset adjusting means so that the rise time of the output of said poststage amplifier after the power supply is switched on at the upper limit operating temperature of said semiconductor sensor is equal to the rise time at the lower limit operating temperature. That is, room temperature output voltage VmR of the prestage amplifier is adjusted so as to satisfy the following equations:

$$AvC \times (VmC - Vr) = AvH \times (VmH \times Vr)$$

$$VmC = \alpha \times VmR$$

$$VmH = \beta \times VmR$$

where AvC denotes the amplification factor of the poststage amplifier at the lower limit operating temperature; AvH, the amplification factor of the poststage amplifier at the upper limit operating temperature; VmC, the output voltage of the prestage amplifier Vm at the lower limit operating temperature; VmH, the output voltage of the prestage amplifier at the upper limit operating temperature; and $\alpha$ and $\beta$, positive proportional constants.

Further, the offset adjusting means comprises resistors printed on a printed circuit board, and the output voltage Vm of the prestage amplifier is adjusted by trimming the printed resistors.

Further, the present invention provides a method of adjusting the output of a semiconductor sensor which employs semiconductor as a sensor element and which comprises a bridge circuit formed with pioezoresistors exhibiting the piezoresistance effect of semiconductor. The bridge circuit produces unbalanced voltages which undergoes differential amplification with a prestage amplifier comprising at least single-stage amplifier, is filtered through a high-pass filter with a reference voltage Vr, is amplified with a poststage amplifier comprising at least one single-stage amplifier with a reference voltage Vr, and then is output from the semiconductor sensor. That is, the present invention provides a method of reducing the maximum rise time of the output of the poststage amplifier after the power supply is switched on by adjusting the output voltage Vm of the prestage amplifier by adjusting the offset of the bridge circuit.

More specifically, this method adjusts the output voltage Vm of the prestage amplifier by adjusting the offset of the bridge circuit so that the rise time of the output of said poststage amplifier after the power supply is switched on at the upper limit operating temperature of said semiconductor sensor is equal to the rise time at the lower limit operating temperature. That is, room temperature output voltage VmR of the prestage amplifier is adjusted in order to satisfy the following equations:

$$AvC \times (VmC - Vr) = AvH \times (VmH - Vr)$$

$$VmC = \alpha \times VmR$$

$$VmH = \beta \times VmR$$

where AvC denotes the amplification factor of the poststage amplifier at the lower limit operating temperature; AvH, the amplification factor of the poststage amplifier at the upper limit operating temperature; VmC, the output voltage of the prestage amplifier Vm at the lower limit operating temperature; VmH, the output voltage of the prestage amplifier at the upper limit operating temperature; and $\alpha$ and $\beta$, positive proportional constants.

The output voltage Vm of the prestage amplifier may be adjusted by adjusting the offset of the bridge circuit through trimming the resistors printed on a printed circuit board.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENT

The present invention will be described in detail with reference to the accompanying drawings.

A semiconductor acceleration sensor will be described in detail as an example of the semiconductor sensor of the present invention.

Figure 1:
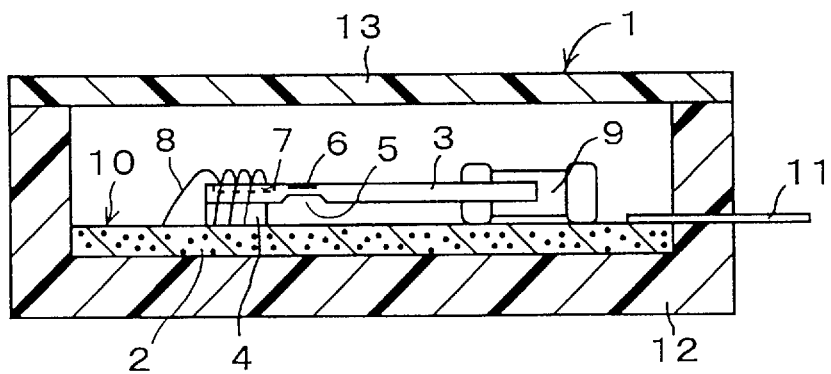
FIG. 1 shows an internal structure of the semiconductor acceleration sensor of Embodiment 1 of the present invention.

FIG. 1 is a partial cross section showing an internal structure of a semiconductor acceleration sensor to which the present invention is applied. Semiconductor acceleration sensor 1 shown in FIG. 1 includes a sensor chip 3, one end of which is fixed onto a pedestal 4 formed on a ceramic substrate 2 to form a cantilever structure. The sensor chip 3 is made of a p-type semiconductor, for example, and has a diaphragm 5 formed by etching the back surface of the sensor chip 3. Four resistors (referred to as the piezoresistors) are formed on the surface of the diaphragm by thermal-diffusing or implanting p-type impurities such as boron so that the resistors will exhibit the piezoresistance effect. An acceleration detecting element 6 is formed by connecting those resistors in a bridge circuit configuration with wiring formed by diffusing a high concentration of a p-type impurity or by vacuum deposition of aluminum metal. Thus the sensor chip is designed so that a strain concentrates on the piezoresistors.

When the acceleration sensor is accelerated, the sensor chip 3 bends at the diaphragm 5 and a strain is generated at the diaphragm 5, which causes a change in the resistances of the piezoresistors depending on the magnitude of the strain (or the acceleration). The change in the resistances causes the bridge circuit to produce an unbalanced voltage output, which is a measure of the acceleration and is referred to as the acceleration signal. Since a typical acceleration signal is small, a signal processing circuit 7, including a signal amplifier, a diagnostic circuit, and an abnormality detection circuit, is also formed on the sensor chip 3.

The above signal processing circuit 7 is connected to a hybrid integrated circuit (hybrid IC) 10 formed on the aforementioned ceramic substrate 2 by gold or aluminum bonding wiring 8, the hybrid IC 10 comprising a thick-film resistor substrate including a high-pass filter capacitor 9, a sensitivity adjusting resistor (not shown), and an offset adjusting resistor (not shown). Lead terminals 11 are attached to the ceramic substrate 2. Thus, an acceleration signal is amplified by the signal processing circuit 7, modified by the hybrid IC 10, and then transferred to an external device such as a microcomputer via lead terminals 11. The sensor chip 3 and the hybrid IC 10 in this configuration are secured inside an open resin package 12 made of PPS with the leads 11 extending outside the package 12. Then the package 12 is concealed, as shown in the figure, with a cap 13 made of the same material as the package 12.

Figure 2:
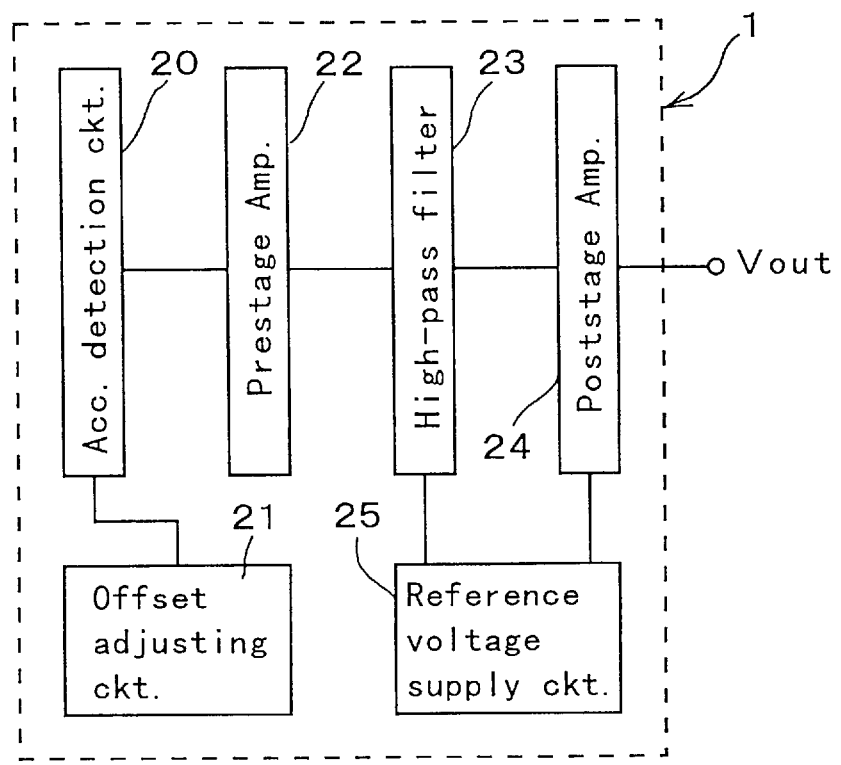
FIG. 2 is a schematic block diagram showing a circuit of the semiconductor acceleration sensor 1 shown in FIG. 1.

FIG. 2 is a schematic block diagram showing the circuit of the semiconductor acceleration sensor 1 illustrated in FIG. 1. Referring to FIG. 2, the semiconductor acceleration sensor 1 comprises an acceleration detecting circuit 20 including the acceleration detecting element 6. It also comprises an offset adjusting circuit 21, a prestage amplifier 22 performing differential amplification, a high-pass filter 23, a poststage amplifier 24, and a reference voltage supply circuit 25. The acceleration detecting circuit 20 is connected to the offset adjusting circuit 21 and the prestage amplifier 22. The prestage amplifier 22 is connected to the high-pass filter 23, which, in turn, is connected to the poststage amplifier 24. An output of the poststage amplifier 24 is an output of the semiconductor acceleration sensor 1. Further, the high-pass filter 23 and the poststage amplifier 24 are connected to the reference voltage supply circuit 25.

When the semiconductor acceleration sensor 1 with the above configuration is accelerated, the acceleration detecting circuit 20 outputs an acceleration signal to the prestage amplifier 22, which performs differential amplification on the acceleration signal and transfers it to the high-pass filter 23. The high-pass filter 23, with the reference voltage Vr supplied by the reference voltage supply circuit 25, eliminates the DC component of the acceleration signal amplified by the prestage amplifier 22 and outputs it to the poststage amplifier 24. The acceleration signal amplified by the poststage amplifier 24 is output through the output terminals Vout. The reference voltage supply circuit 25 also provides the poststage amplifier 24 with the reference voltage Vr.

The acceleration detecting circuit 20 comprises a bridge circuit formed with piezoresistors which may show variations from their proper resistances. Hence the bridge circuit has an offset. The offset adjusting circuit 21 compensates for this variation. The acceleration detecting circuit 20 senses an acceleration; the offset adjusting circuit 21 adjusts the offset; the prestage amplifier 22 prestage amplifies the acceleration signal; the poststage amplifier 24 post-amplifies also the acceleration signal; and the reference voltage supply circuit 25 provides the reference voltage.

Embodiment 1 will be further described with reference to a circuit which implements the configuration shown in FIG. 2.

Figure 3:
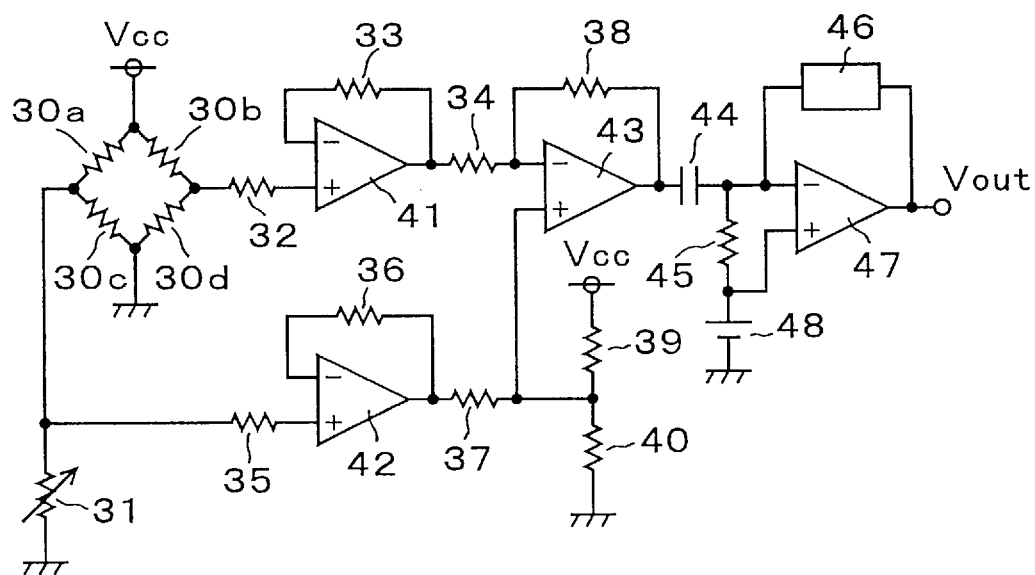
FIG. 3 shows a circuit implementing the schematic block diagram of the semiconductor acceleration sensor 1 shown in FIG. 2.

FIG. 3 shows a circuit of the semiconductor acceleration sensor 1 which implements the configuration shown in FIG. 2. Referring to FIG. 3, the acceleration detecting circuit 20 in FIG. 2 comprises the acceleration detecting element 6 including piezoresistors 30a, 30b, 30c, and 30d; the offset adjusting circuit 21 in FIG. 2 comprises an offset adjusting resistor 31; the prestage amplifier 22 in FIG. 2 comprises resistors 32, 33, 34, 35, 36, 37, 38, 39, and 40 and operational amplifiers 41, 42, and 43; the high-pass filter 23 in FIG. 2 comprises a capacitor 44 and a resistor 45; and the poststage amplifier 24 in FIG. 2 comprises a resistor circuit 46 and an operational amplifier 47. Further the reference voltage supply circuit 25 in FIG. 2 comprises a DC power supply 48 and provides the reference voltage to the high-pass filter 23 and the poststage amplifier 24. Strictly speaking the DC power supply 48 belongs to the high-pass filter 23 as well as to the poststage amplifier 24.

As mentioned above, the acceleration detecting element 6 comprises a bridge circuit composed of four piezoresistors 30a, 30b, 30c, and 30d formed on the surface of the diaphragm of the sensor chip. The power supply voltage Vcc is applied at one of the input terminals of the bridge circuit or at the connection point of the piezoresistors 30a and 30b, while the other input terminal or the connection point of the piezoresistors 30c and 30d is grounded.

One of the output terminals of the bridge circuit or the connection point of the piezoresistors 30b and 30d is connected, via a resistor 32, to the non-inverted input terminal of the operational amplifier 41. The inverted input terminal of the operational amplifier 41 is connected, via a resistor 33, to the output terminal of the operational amplifier 41 so that the operational amplifier 41 forms a voltage follower. The resistance of the resistor 33 is set to be equal to the combined resistance of the piezoresistors 30c and 30d when there is no strain produced on the acceleration detecting element 6.

The other output terminal of the bridge circuit or the connection point of the piezoresistors 30a and 30c is connected, via the offset adjusting resistor 31, to the ground and, also, via a resistor 35, to the non-inverted input terminal of the operational amplifier 42. The inverted input terminal of the operational amplifier 42 is connected, via a resistor 36, to the output terminal of the operational amplifier 42 so that the operational amplifier 42 forms a voltage follower. The resistance of the resistor 36 is set to be equal to the combined resistance of the piezoresistors 30a and 30b when there is no strain produced on the acceleration detecting element 6.

The output terminal of the operational amplifier 41 is connected, via a resistor 34, to the inverted input terminal of the operational amplifier 43 while the output terminal of the operational amplifier 42 is connected, via a resistor 37, to the non-inverted input terminal of the operational amplifier 43. The inverted input terminal of the operational amplifier 43 is connected, via a resistor 38, to the output terminal of the operational amplifier 43. Resistors 39 and 40 are connected in series; the power supply voltage Vcc is applied to the resistor 39; and the resistor 40 is grounded as shown in FIG. 3. The non-inverted input terminal of the operational amplifier 43 is connected to the connection point of the resistors 39 and 40; and the output terminal of the operational amplifier 43 is connected, via a capacitor 44, to the inverted input terminal of the operational amplifier 47.

The inverted input terminal of the operational amplifier 47 is connected, via a resistor 45, to the positive side terminal of the DC power supply 48; and the negative side terminal of the DC power supply 48 is grounded. The non-inverted input terminal of the operational amplifier 47 is connected to the positive side terminal of the DC power supply 48. The DC power supply 48 functions as a reference voltage supply for the operational amplifier 47 and for the high-pass filter formed with the capacitor 44 and the thick film resistor 45. The resistor circuit 46, for temperature compensation, couples the inverted input terminal and output terminal of the operational amplifier 47. The output terminal of the operational amplifier 47 is also an output terminal for the semiconductor acceleration sensor 1.

The acceleration detecting element 6 has negative temperature dependence. Accordingly, when the temperature rises, the voltage difference between the two inputs to the operational amplifier 43, which operates as a differential amplifier, is reduced and the output voltage of the operational amplifier 43 is also reduced. The resistor circuit 46, connected to the operational amplifier 47, comprises one or more resistors and is designed to have a positive temperature dependence so that the poststage amplifier 24, formed with the operational amplifier 47, has a positive temperature dependence. Therefore, the resistor circuit 46 compensates for the negative temperature dependence of the acceleration detecting element 6 or of the semiconductor acceleration sensor 1. The operational amplifiers 41 and 42 form voltage followers and have high input impedances. Accordingly, they are not influenced by the impedance change of the acceleration detecting element 6 and transfer the unbalanced voltages from the acceleration detecting element 6 to the input terminals of the operational amplifier 43 with a low impedance.

Since the piezoresistors 30a–30d may deviate in resistance from their designed values, the bridge circuit formed with those piezoresistors has an offset circuit to compensate for the deviation. The offset adjustment is effected by trimming the thick-film offset adjusting resistor 31.

When the semiconductor acceleration sensor is accelerated, a strain is produced on the diaphragm, and the piezoresistors 30a–30d change in resistance according to the magnitude of the acceleration, which causes the bridge circuit, formed with those piezoresistors, to produce unbalanced voltage outputs or acceleration signals.

The acceleration signals typically have small signal levels and are differentially amplified by the operational amplifier 43. The differentially amplified acceleration signal passes through the high-pass filter formed with the capacitor 44 and the resistor 45 and biased with the reference voltage provided by the DC power supply 48. Hence the DC component of the acceleration signal is eliminated. The amplifier comprising the operational amplifier 47 further amplifies the acceleration signal, cancels out the signal's temperature dependence due to the acceleration detecting element 6, and outputs the acceleration signal through the output terminals Vout.

The semiconductor acceleration sensor 1 with the high-pass filter does not produce a correct output after the power supply is switched on until the capacitor 44 of the high-pass filter is fully charged up. That is, the semiconductor acceleration sensor 1 has a finite rise time before it produces correct outputs. This rise time t is expressed in the equation (1) below:

$$t = CR \ln|(Vm-Vr)/(k/Av)| \qquad (1)$$

where C denotes the capacitance of the capacitor 44; R, the resistance of the resistor 45; Vm, the output voltage of the prestage amplifier 22 at a room temperature, that is, the output voltage of the operational amplifier 43 at a room temperature; Vr, the voltage of the DC power supply 48; k, the output voltage error of the semiconductor acceleration sensor 1 which does not prevent the normal operation of the acceleration sensor; Av, the amplification factor of the poststage amplifier 24 or the amplification factor of the amplifier formed with the operational amplifier 47.

The sensitivity of the semiconductor acceleration sensor 1 is determined by the piezoresistance coefficient of the silicon material forming the sensor chip 3, which has a positive temperature coefficient. Therefore, the amplification factor of the amplifier formed with the operational amplifier 47 is designed to have a negative temperature coefficient so that the amplifier can cancel the temperature dependence of the sensitivity of the semiconductor acceleration sensor 1. Therefore, if the Vm is equal at the lower and upper limit operating temperatures (referred simply to as the low and high temperatures respectively), the rise time t of the semiconductor acceleration sensor 1 after the power is switched on is longer than the equation (1) at the high temperature and shorter at the low temperature. In this case the design covering the entire temperature range must be done using the longest rise time at the high temperature.

If we can make the rise time t at the high temperature (tH) equal to the rise time t at the low temperature (tC), that is, tH=tC, the rise time at the high temperature will be reduced.

Accordingly the shorter rise time of the semiconductor acceleration sensor 1 can be used in the design with the semiconductor acceleration sensor 1 for the entire temperature range. Assuming that neither C nor R have temperature dependence, the equation (2) is obtained by equating tH with tC:

$$AvC \times (VmC-Vr) = AvH \times (VmH-Vr) \qquad (2)$$

where AvC denotes the amplification factor of the poststage amplifier 24 at the low temperature or the amplification factor of the amplifier configured with the operational amplifier 47 at the low temperature; AvH, the amplification factor of the poststage amplifier 24 at the high temperature or the amplification factor of the amplifier configured with the operational amplifier 47 at the high temperature; VmC, the output voltage of the prestage amplifier 22 at the low temperature or the output voltage Vm of the operational amplifier 43 at the low temperature; VmH, the output voltage of the prestage amplifier 22 at the high temperature or the output voltage Vm of the operational amplifier 43 at the high temperature. As mentioned above, the C and R are assumed to have no temperature dependence.

The VmC and VmH are expressed as equations (3) and (4) below respectively:

$$VmC = \alpha \times VmR \qquad (3)$$

$$VmH = \beta \times VmR \qquad (4)$$

where VmR is the output voltage of the prestage amplifier 22 at a room temperature or the output voltage Vm of the operational amplifier 43 at a room temperature; and $\alpha$ and $\beta$ are positive constants.

By properly adjusting the Vm at a room temperature by trimming the offset adjusting resistor 31 and by using the equations (3) and (4) one can satisfy the equation (2) and thus reduce the rise time t at the high temperature. Therefore, in designing with the semiconductor acceleration sensor 1, one can use the shorter rise time, that is the time it takes for the semiconductor acceleration sensor 1 to produce stable outputs after the power is switched on.

Although in the present Embodiment the prestage amplifier 22 employs a one-stage differential amplifier, it can be configured with a multistage differential amplifier using a plurality of operational amplifiers. Similarly, although the poststage amplifier 24 is an one-stage amplifier, it can also be a multistage amplifier.

An operational example of the semiconductor acceleration sensor of Embodiment 1 of the present invention will be given below.

The power supply voltage Vcc is assumed to be 5 V. The rise times of the present Embodiment will be compared with conventional values using the following parameters:

The reference voltage: 2.5 V
Vm at the high temperature (VmH): 3 V
Vm at the low temperature (VmC): 3 V
The time constant (CR) of the high-pass filter: 0.1
The k/Av at a room temperature (k/AvR): 100/10
The k/Av at the low temperature (k/AvC): 100/9
The k/Av at the high temperature (k/AvH): 100/11.

In the conventional method trimming is done so that VmR=Vr, which gives:

The t at a room temperature (tR): 0 second
The t at the low temperature (tC): 4.5 second
The t at the high temperature (tH): 5.5 second.

In the method of the Embodiment of the present invention trimming is done so that all the equations (2)–(4) are satisfied. If VmR is set to be 2.45 V, for example, we obtain:

The t at a room temperature (tR): 0.05 second

The t at the low temperature (tC): 4.95 second

The t at the high temperature (tH): 4.95 second. Using this method, we can reduce the rise time t of the semiconductor acceleration sensor 1 after the power is switched on by 10% over the entire operating temperature region (high temperature). Room temperature in the above means 25° C.; the high temperature, 85° C.; and the low temperature, −40° C.

As shown in the above, the semiconductor sensor of the present invention is made so that the maximum rise time of the output of the poststage amplifier of the semiconductor sensor after the power is switched on is reduced by adjusting the output voltage Vm of the prestage amplifier by adjusting the offset adjusting circuit. More specifically, adjustment of the output voltages Vm of the prestage amplifier is made so that the rise times of the poststage amplifier at the lower limit and upper limit operating temperatures are equal. That is, the output voltage VmR of the prestage amplifier at a room temperature is adjusted so that the following three equations simultaneously hold:

$$AvC \times (VmC-Vr) = AvH \times (VmH-Vr)$$

$$VmC = \alpha \times VmR$$

$$VmH = \beta \times VmR.$$

This adjustment reduces the rise time of a semiconductor sensor over the entire guaranteed operating temperature range and provides an accurate semiconductor sensor that allows the design with this semiconductor sensor to use this reduced rise time.

The offset adjusting circuit comprises simply configured resistors printed on a printed-circuit board with a resistor material and the adjustment of the output voltage Vm of the prestage amplifier is done by trimming the printed resistors. Therefore, the semiconductor sensor with a reduced rise time guaranteed over the entire operating temperature range can be made easily and at low cost.

Further, according to the method of the present invention for adjusting the output of the semiconductor sensor, the output of the prestage amplifier Vm is adjusted by adjusting the offset of the bridge circuit in order to reduce the maximum rise time of the output of the poststage amplifier after power is switched on. More specifically, adjustment of the output voltage Vm of the prestage amplifier is made by adjusting the offset of the bridge circuit so that the rise times of the poststage amplifier at the lower limit and higher limit operating temperatures are equal. That is, the output voltage VmR of the prestage amplifier at a room temperature is adjusted so that the following three equations simultaneously hold:

$$AvC \times (Vmc-Vr) = AvH \times (VmH-Vr)$$

$$VmC = \alpha \times VmR$$

$$VmH = \beta \times VmR.$$

This method for adjusting the output of the semiconductor sensor reduces the rise time of the semiconductor sensor over the entire guaranteed operating temperature range and allows design with the semiconductor sensor to use this reduced rise time over the entire guaranteed operating temperature range.

The adjustment of the output voltage Vm of the prestage amplifier is done by adjusting the offset of the bridge circuit by trimming the printed resistors printed on a printed-circuit board with a resistor material. Therefore, the reduction of the rise time of the semiconductor sensor guaranteed over the entire operating temperature range can be accomplished easily and at low cost.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A semiconductor sensor employing semiconductor as a sensor element, comprising:

sensor means including a bridge circuit formed with piezoresistors exhibiting the piezoresistance effect;

a high-pass filter including a capacitor and a resistor;

a prestage amplifier which is placed before said high-pass filter and differentially amplifies an unbalanced voltage produced at said sensor means;

a poststage amplifier which is placed after said high-pass filter and amplifies an output voltage that passed through said high-pass filter after having been amplified by said prestage amplifier;

a reference voltage supply providing a reference voltage to said high-pass filter and said poststage amplifier; and offset adjusting means which adjusts an offset of said sensor means;

said offset adjusting means adjusting an output voltage of said prestage amplifier Vm by adjusting the offset of said sensor means in order to reduce the maximum rise time of an output of said poststage amplifier after the power supply is switched on.

2. The semiconductor sensor according to claim 1, wherein said offset adjusting means adjusts the output voltage Vm of said prestage amplifier so that the rise time of the output of said poststage amplifier after the power supply is switched on at an upper limit operating temperature of said semiconductor sensor is equal to the rise time at a lower limit operating temperature.

3. The semiconductor sensor according to claim 1, wherein said offset adjusting means adjusts the room temperature output voltage VmR of said prestage amplifier in order to satisfy the following equations:

$$AvC \times (Vmc-Vr) = AvH \times (VmH-Vr)$$

$$VmC = \alpha \times VmR$$

$$VmH = \beta \times VmR$$

where AvC denotes the amplification factor of said poststage amplifier at said lower limit operating temperature; AvH, the amplification factor of said poststage amplifier at the upper limit operating temperature; VmC, the output voltage of said prestage amplifier Vm at said lower limit operating temperature; VmH, the output voltage of said prestage amplifier at said upper limit operating temperature; and $\alpha$ and $\beta$, positive proportional constants.

4. The semiconductor sensor according to claim 1, wherein said offset adjusting means comprises at least one printed resistor printed on a printed circuit board, said printed resistor being trimmed for adjustment of the output voltage Vm of said prestage amplifier.

* * * * *